US009084087B2

(12) United States Patent
Ekbatani et al.

(10) Patent No.: US 9,084,087 B2
(45) Date of Patent: Jul. 14, 2015

(54) DETECTING EARLIEST CHANNEL PATH IN LOCATION TRACKING SYSTEMS

(71) Applicant: QUALCOMM Incorporated, San Diego, CA (US)

(72) Inventors: Siavash Ekbatani, San Diego, CA (US); Alok Kumar Gupta, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 13/966,079

(22) Filed: Aug. 13, 2013

(65) Prior Publication Data

US 2015/0050944 A1 Feb. 19, 2015

(51) Int. Cl.

| | |
|---|---|
| ***H04W 4/04*** | (2009.01) |
| ***H04B 1/7163*** | (2011.01) |
| ***G01S 5/02*** | (2010.01) |
| ***G01S 11/08*** | (2006.01) |
| *G01S 5/14* | (2006.01) |

(52) U.S. Cl.

CPC ............... *H04W 4/04* (2013.01); *G01S 5/0215* (2013.01); *G01S 5/0221* (2013.01); *G01S 11/08* (2013.01); *H04B 1/7163* (2013.01); *G01S 5/14* (2013.01)

(58) Field of Classification Search

CPC .......... H04B 1/69; H04B 1/7163; H04B 7/04; H04B 7/0404; H04B 7/0426; H04B 7/0491; H04B 2001/3827; H04B 2001/40; H04B 2001/69; H04B 2001/6908; H04W 4/04; G01S 5/0215; G01S 5/0221; G01S 5/14; G01S 11/02; G01S 11/023; G01S 11/08

USPC ................. 375/130, 138, 141, 224, 259, 260; 370/310, 328, 345; 455/461, 73, 88, 455/550.1, 552.1, 553.1

See application file for complete search history.

(56) References Cited

U.S. PATENT DOCUMENTS 7,526,048 B2 4/2009 Sahinoglu et al.

(Continued)

FOREIGN PATENT DOCUMENTS

| | | | |
|---|---|---|---|
| GB | 2458446 | A | 9/2009 |
| WO | WO-2013100930 | A1 | 7/2013 |

OTHER PUBLICATIONS

Guvenc et al., “Threshold Selection for UWB TOA Estimation Based on Kurtosis Analysis,” IEEE Communication Letters, TR2005-121, Dec. 2005, vol. 9, No. 2, 5 pgs., URL http://www.merl.com/publications/docs/TR2005-121.pdf, Institute of Electrical and Electronics Engineers.

(Continued)

*Primary Examiner* — Young T Tse

(74) *Attorney, Agent, or Firm* — Holland & Hart LLP

(57) ABSTRACT

Methods, systems, and devices for detecting earliest channel path and/or determining time of arrival of signals in location tracking systems are described. An ultra-wideband (UWB) signal may be received from a tag. A noise estimation level above which the UWB signal is detectable may be determined using a noise estimation metric. A channel impulse response (IR) energy level may be determined using a channel energy metric. A leading edge window of the UWB signal may be identified. The leading edge window may be based on, at least in part, the noise estimation level and the channel IR energy level.

46 Claims, 11 Drawing Sheets

800

Receive an ultra-wideband signal from a tag — 805

Determine a noise estimation level above which the ultra-wideband signal is detectable — 810

Determine a channel impulse response energy level — 815

Identify a leading edge window of the ultra-wide band signal based on, in part, the noise estimation level and the channel impulse response energy level — 820

Determine a time of arrival of a signal path — 825

Adjust parameters of the metrics to alter sensitivity to noise — 830

(56) References Cited

U.S. PATENT DOCUMENTS

| | | | | |
|---|---|---|---|---|
| 7,719,280 | B2 | 5/2010 | Lagae et al. | |
| 8,179,816 | B1 | 5/2012 | Vaidyanathan et al. | |
| 2006/0022815 | A1 * | 2/2006 | Fischer et al. | 340/505 |
| 2009/0170458 | A1 * | 7/2009 | Molisch et al. | 455/226.1 |
| 2010/0054304 | A1 * | 3/2010 | Barnes et al. | 375/130 |
| 2011/0286505 | A1 | 11/2011 | Hedley et al. | |
| 2011/0316747 | A1 * | 12/2011 | Budianu et al. | 342/387 |

OTHER PUBLICATIONS

Wu et al., "Match-Filtering Based TOA Estimation for IR-UWB Ranging Systems," 2008 International Wireless Communications and Mobile Computing Conference, IWCMC '08, Crete Island, Aug. 6-8, 2008, pp. 1099-1105, ISBN 978-1-4244-2201-2, Institute of Electrical and Electronics Engineers.

ISA/EPO, International Search Report and Written Opinion of the International Searching Authority, Int'l App. No. PCT/US2014/049594, Dec. 1, 2014, European Patent Office, Rijswijk, NL, 12 pgs.

* cited by examiner

DETECTING EARLIEST CHANNEL PATH IN LOCATION TRACKING SYSTEMS

BACKGROUND

In some settings, such as in indoor and enterprise environments, for example, it may be desirable to locate various types of assets and/or people. Examples of such settings include hospitals, retail stores, warehouses, etc. The accuracy and speed with which the location of assets or people may be monitored in an indoor setting may be a factor in determining the usefulness of a tracking system.

Different systems and devices may be used to locate assets and/or people in a particular indoor environment. In one example, an ultra-wideband (UWB) network, or some other radio frequency network deployed throughout at least a portion of the indoor environment, may be configured to perform indoor tracking. In such a system, there may be multiple access points (APs) placed at specific locations in the indoor environment. Also, a tag may be attached to each mobile asset and/or to each person to be tracked. The tag may transmit waveforms (e.g., beacon signals) that are received by the APs for ranging measurements to determine the distance between the tag and the APs that receive the waveforms. Once the distances between the tag and at least three different APs are obtained, triangulation or trilateration may be used to estimate the location of the asset or person attached to the tag. The APs may be synchronized to each other to perform accurate triangulation calculations. It may be desirable for the tracking system to provide continuous location monitoring.

SUMMARY

Methods, systems, and devices are provided that address issues pertaining to effective asset and/or people-tracking in an indoor environment. The methods, systems, and/or devices may include tools and techniques in which UWB signals transmitted from tags, which may be attached to assets and/or people, may be received, identified, processed, and/or utilized for determining a time of arrival of the signal. The described tools and techniques may allow for detecting an earliest channel ray of a UWB signal by, in part, allowing for detection of the moment of distribution change within a channel impulse response (IR) random waveform.

The tools and techniques may include a noise estimation metric, which may determine a noise estimation level above which a tag's UWB signal is detectable. The tools and techniques may include a channel energy metric, which may be based on a ratio of the fourth and second moments of a channel IR, and which may determine a channel impulse response (IR) energy level. The tools and techniques may identify a leading edge window of a received UWB signal based on the noise estimation level and the channel IR energy level. The tools and techniques may identify a leading edge window by detecting a time when the channel IR energy level has a semi-positive slope that exceeds the noise estimation level. The tools and techniques may determine a time of arrival with a peak search metric that may be applied to the identified leading edge window.

In some embodiments, a method for location tracking includes: receiving, at an access point (AP), an ultra-wideband (UWB) signal from a tag; determining, with a noise estimation metric, a noise estimation level above which the UWB signal is detectable; determining, with a channel energy metric, a channel impulse response (IR) energy level; and identifying a leading edge window of the UWB signal based on the noise estimation level and the channel IR energy level.

The noise estimation metric of the method may involve selecting a maximum value of: a shaped noise estimation and a precursor threshold estimation.

In some cases, the channel energy metric of the method indicates the channel IR energy level in finite length sliding windows and indicates the existence of a channel cluster within the window duration.

According to some embodiments of the method, the channel energy metric includes a ratio of a fourth moment and a second moment of the channel IR.

In some embodiments of the method, identifying the leading edge window involves detecting a time when the channel IR energy level has a semi-positive slope that exceeds the noise estimation level.

The method may also involve determining, with a peak search metric, a time of arrival of a signal path.

In some cases, the peak search metric of the method includes: applying a maximum peak search metric to at least the channel IR, the noise estimation level, and the leading edge window; and applying a fat-path correction metric to at least the channel IR and the output of the maximum peak search metric.

The method may further involve adjusting parameters of the metrics to alter sensitivity to noise.

The method may include automatically adjusting parameters of one or more metrics subject to one or more re-run conditions.

In some embodiments, the method also includes transmitting, from the AP to a tag tracking management server, the UWB signal.

The method may additionally involve receiving, at an AP, a plurality of reference signals from a plurality of reference points.

In some cases the method, further includes transmitting, from the AP to the tag tracking management server, the plurality of reference signals.

In some embodiments, a system for location tracking includes: means for receiving, at an AP, a UWB signal from a tag; means for determining, with a noise estimation metric, a noise estimation level above which the UWB signal is detectable; means for determining, with a channel energy metric, a channel IR energy level; and means for identifying a leading edge window of the UWB signal based on the noise estimation level and the channel IR energy level.

For example, the noise estimation metric of the system may involve selecting a maximum value of: a shaped noise estimation and a precursor threshold estimation.

In some cases, the channel energy metric of the system indicates the channel IR energy level in finite length sliding windows and indicates the existence of a channel cluster within the window duration.

According to some embodiments, the system's channel energy metric involves a ratio of a fourth moment and a second moment of the channel IR.

In some embodiments of the system, identifying the leading edge window includes detecting a time when the channel IR energy level has a semi-positive slope that exceeds the noise estimation level.

In some embodiments, the system also includes means for determining, with a peak search metric, a time of arrival of a signal path.

For example, the peak search metric of the system may include: applying a maximum peak search metric to at least the channel IR, the noise estimation level, and the leading edge window; and applying a fat-path correction metric to at least the channel IR and the output of the maximum peak search metric.

The system may also include means for adjusting parameters of the metrics to alter sensitivity to noise.

Additionally or alternatively, the system may include means for automatically adjusting parameters of one or more of the metrics subject to one or more automatic re-run conditions.

In some cases, the system further includes means for transmitting, from the AP to a tag tracking management server, the UWB signal.

Additionally, the system may include means for receiving, at the AP, a plurality of reference signals from a plurality of reference points.

The system may also include means for transmitting, from the AP to the tag tracking management server, the plurality of reference signals.

According to some embodiments, an apparatus for location tracking includes: a processor; memory in electronic communication with the processor; and instructions stored in the memory. The instructions may be executable by the processor to: receive, at an AP, a UWB signal from a tag; determine, with a noise estimation metric, a noise estimation level above which the UWB signal is detectable; determine, with a channel energy metric, a channel IR energy level; and identify a leading edge window of the UWB signal based on the noise estimation level and the channel IR energy level.

By way of example, the apparatus may include instructions for a noise estimation metric that involves selecting a maximum value of: a shaped noise estimation and a precursor threshold estimation.

In some cases, the apparatus includes instructions for a channel energy metric that indicates the channel IR energy level in finite length sliding windows and indicates the existence of a channel cluster within the window duration.

According to some embodiments, the apparatus has instructions that include a channel energy metric that involves a ratio of a fourth moment and a second moment of the channel IR.

The apparatus may include instructions to identify the leading edge window that are executable by the processor to detect a time when the channel IR energy level has a semi-positive slope that exceeds the noise estimation level.

The apparatus also may have instructions executable by the processor to determine, with a peak search metric, a time of arrival of a signal path.

In some embodiments of the apparatus, the instructions to determine the time of arrival are executable by the processor to: apply a maximum peak search metric to at least the channel IR, the noise estimation level, and the leading edge window; and apply a fat-path correction metric to at least the channel IR and the output of the maximum peak search metric.

In some cases, the apparatus is equipped with instructions executable by the processor to adjust parameters of the metrics to alter sensitivity to noise.

According to some embodiments of the apparatus, the instructions are executable by the processor to transmit, from the AP to a tag tracking management server, the UWB signal.

In some embodiments, the apparatus' instructions are executable by the processor to receive, at the AP, a plurality of reference signals from a plurality of reference points.

In some cases, the apparatus' instructions are executable by the processor to transmit, from the AP to the tag tracking management server, the plurality of reference signals.

In still other embodiments, a computer-program product for location tracking includes a non-transitory computer-readable medium storing instructions executable by a processor to: receive an ultra-wideband UWB signal from a tag; determine, with a noise estimation metric, a noise estimation level above which the UWB signal is detectable; determine, with a channel energy metric, a channel IR energy level; and identify a leading edge window of the UWB signal based on the noise estimation level and the channel IR energy level.

The computer-program product may include instructions to determine the noise estimation metric that are executable by the processor to select a maximum value of: a shaped noise estimation and a precursor threshold estimation.

In some cases, the channel energy metric of the computer-program product indicates the channel IR energy level in finite length sliding windows and indicates the existence of a channel cluster within the window duration.

The computer-program product may include instructions for a channel energy metric that involve a ratio of a fourth moment and a second moment of the channel IR.

The computer-program product may include instructions to identify the leading edge window that are executable by the processor to detect a time when the channel IR energy level has a semi-positive slope that exceeds the noise estimation level.

In some embodiments, the computer-program product includes instructions executable by the processor to determine, with a peak search metric, a time of arrival of a signal path.

In further embodiments, the computer-program product has instructions to determine the peak search metric executable by the processor to: apply a maximum peak search metric to at least the channel IR, the noise estimation level, and the leading edge window; and apply a fat-path correction metric to at least the channel IR and the output of the maximum peak search metric.

According to some embodiments, the computer-program product includes instructions executable by the processor to adjust parameters of the metrics to alter sensitivity to noise.

The computer-program product may include instructions executable by the processor to transmit, from the AP to a tag tracking management server, the UWB signal. In some cases, the computer-program product has instructions executable by the processor to receive a plurality of reference signals form a plurality of reference points.

In some embodiments, the computer-program product includes instructions executable by the processor to transmit, from the AP to the tag tracking management server, the plurality of reference signals.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
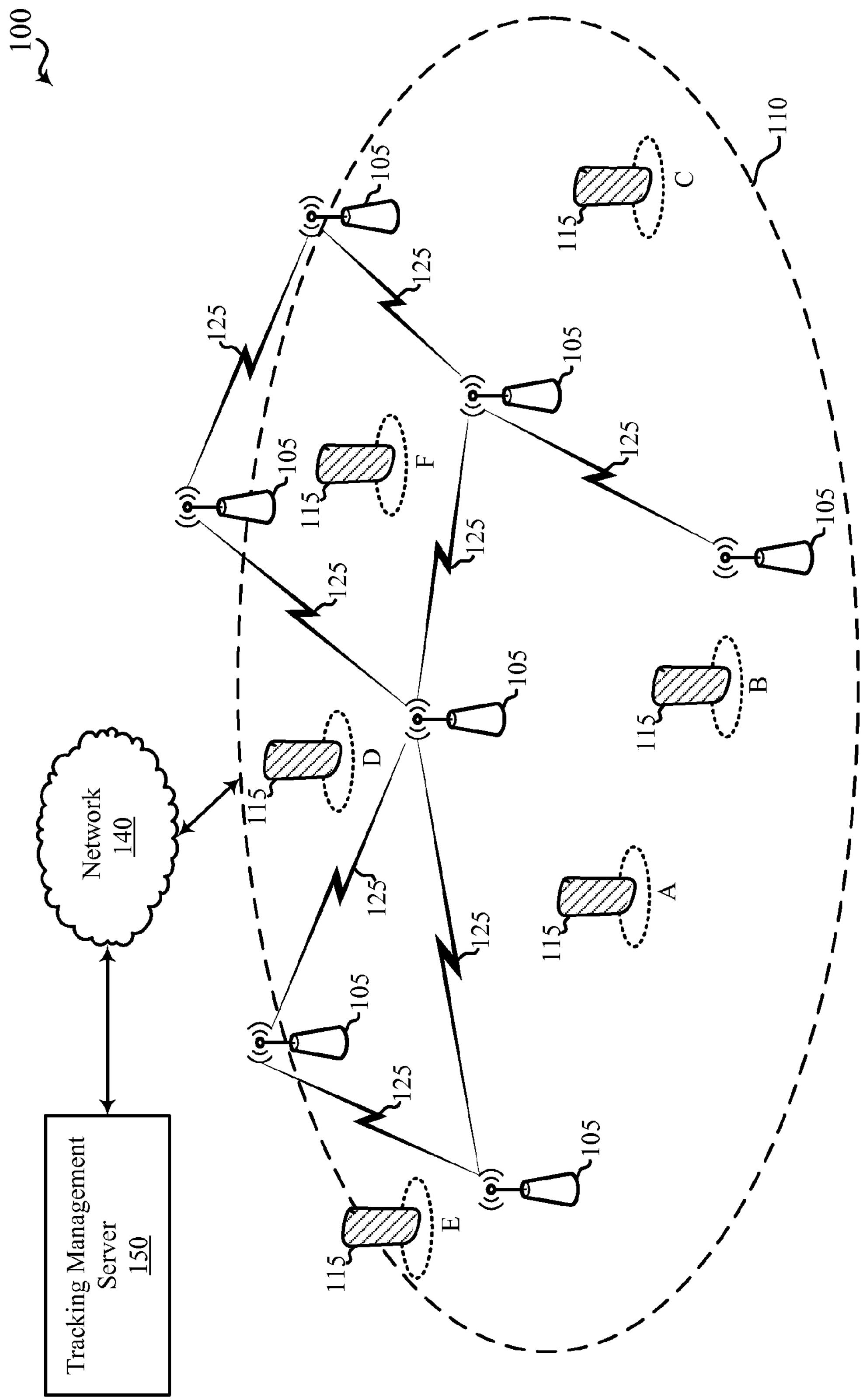
FIGS. 1A and 1B show an exemplary location tracking system.

Methods, systems, and devices are described that address issues pertaining to effective asset and/or people-tracking in an indoor environment. The methods, systems, and/or devices may include tools and techniques in which UWB signals transmitted from tags, which may be attached to assets and/or people, may be received, identified, processed, and/or utilized for determining a time of arrival of the signal. The times of arrival of signals between tag and access point (AP) pairs may be estimated by detecting the index of the earliest path in an estimated channel vector.

In accordance with some embodiments, the tools and techniques described here may be used in a location tracking system and may employ metrics that account for and/or remedy non-idealities that may occur in a band-limited channel estimation system contaminated by noise. The tools and techniques may involve receiving a UWB signal from a tag, utilizing a noise estimation metric to determine a noise level above which the UWB signal is detectable, utilizing a channel energy metric to determine a channel IR energy level, utilizing the noise estimation level and the channel IR energy level to identify a leading edge window, and utilizing a peak search metric to determine a time of arrival of a signal. Channel IR may be a random process with an underlying distribution that changes with a time index. Generally speaking, detecting the time of arrival of an earliest channel ray can be linked to detecting a moment of distribution change within a random waveform. The described tools and techniques may provide for detecting an earliest channel path below a noise floor by confining a peak search window to within a vicinity of a channel distribution change point, and by employing a peak search with adjustable parameters (e.g., an acceptable ratio of detected signal strength to a maximum value of a channel impulse response and/or distance from an eligible maximum index).

Earliest ray or earliest path detection may depend on channel characteristics. The relevant channel characteristics may include a ratio of strongest to earliest channel ray amplitudes. Larger ratios may increase a possibility of false detection. Other relevant characteristics affecting earliest path detection may include delay distribution of channel rays. Earliest path detection may improve with wider channel delay distribution, because with wider distribution, there may be statistically fewer unresolvable paths to accumulate, and so earliest path detection may be more accurate. Likewise, greater signal bandwidth may improve detection accuracy.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1A, an exemplary location tracking system 100 is illustrated in accordance with various embodiments. The system 100 provides location tracking of assets (e.g., objects) and/or people throughout a coverage area 110 associated with an indoor and/or enterprise environment. For example, the coverage area 110 may represent an area of coverage inside a building, a hospital, a store, a warehouse, or some other facility or space. In the coverage area 110, there are deployed multiple APs 105 at specific locations and multiple tags or tag units 115 that may be tracked within the coverage area 110. Because of their stationary nature, the exact distance between any two APs 105 is typically known throughout the operation of the system 100.

The arrangement of APs 105 shown in FIG. 1A is provided by way of illustration and not limitation. For example, the APs 105 may be deployed or distributed within the coverage area 110 in different ways from the pattern shown in FIG. 1A and at different distances from each other. Furthermore, while the arrangement depicts a two-dimensional deployment, the APs 105 may also be deployed in a three-dimensional manner by placing some the APs 105 on different floors or levels of a building within the coverage area 110. In some embodiments, the APs 105 may be associated with a radio network such as a UWB network, for example. One or more of the APs 105 in the network may be used as reference APs to synchronize some of the operations of the network. The APs 105 in the network may communicate with one or more nearby APs using transmission 125 as illustrated in FIG. 1A.

Each of the tag units 115 may be attached to an asset or person being tracked within the coverage area 110. In the example shown in FIG. 1A, there are six tag units 115 at locations A, B, C, D, E, and F. Over time, these locations may change as the assets or people corresponding to the tag units 115 move or are moved within the coverage area 110. It should be understood that the number of tag units 115 is provided as illustrative and that the system 100 may be capable of tracking more or fewer assets or people.

The system 100 includes a tracking management server 150, which may as be referred to as a tag tracking management server, that may be connected to the APs 105 (e.g., connected to a radio network associated with the APs 105) through a network 140. The tracking management server 150 may receive information from the APs 105 to perform various types of calculations, including earliest path detection calculations and/or triangulation or trilateration calculations to estimate a location of an asset or person being tracked within the coverage area 110. The tracking management server 150 may also schedule or coordinate various operations associated with the APs 105 including when to have an AP 105 wirelessly communicate (e.g., transmit or receive UWB signals) with other APs 105 or with tags 115. The tracking management server 150 may have information about different subsets of APs 105 and may use that information to schedule or coordinate various operations between the subsets.

The tracking management system 150 may be used to establish and/or oversee earliest path detection at one or more APs 105 within the system 100. Earliest path detection may involve three stages: noise level estimation, leading edge window acquisition, and peak search. Each of the stages may involve utilizing metrics, which may be implemented in hardware and/or software modules located at the tracking management server 150 and/or at APs 105. In some cases, the tracking management server 150 may direct the APs 105 as to which metrics to employ.

Figure 1B:
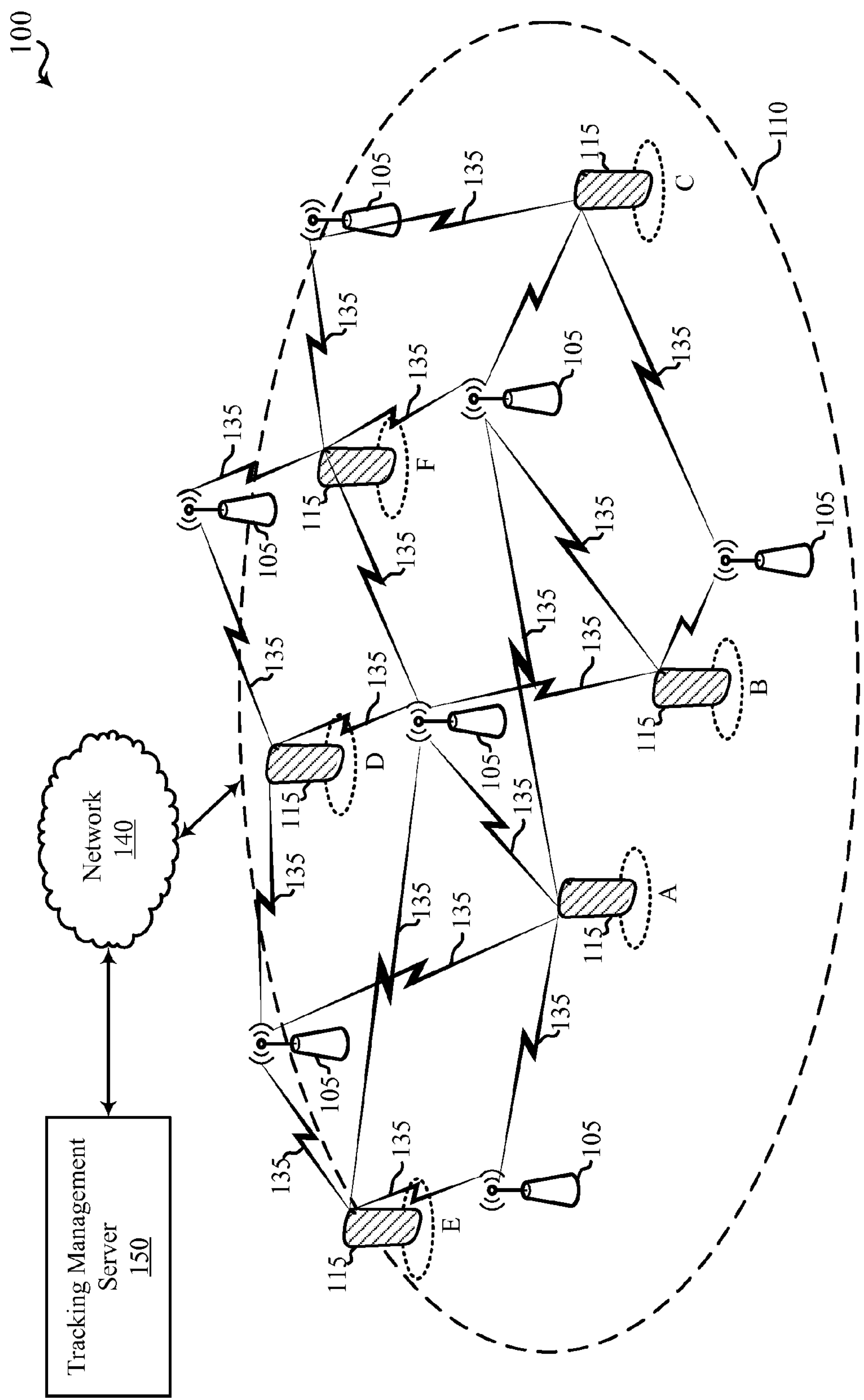

Noise level estimation may involve estimating channel noise. FIG. 1B illustrates the multiple transmissions 135 that may simultaneously occur between tags 115 and APs 105. The quantity and proximity of tags 115 and APs 105 may tend to increase location tracking issues associated with noise in the coverage area 110. Noise may refer to non-idealities of a channel IR. Factors that may affect noise level may include: band-limited effects of the channel IR, side-lobes of a pulse shaping filter, and/or thermal noise at a receiver. However, noise level estimation may be employed at, for example, APs 105 to obtain reliable and robust estimates of an acquisition threshold that may distinguish between resolvable channel IR clusters and a signal amplitude that may rise from undesirable non-idealities of the channel IR in a precursor portion. In some cases, a noise level may be estimated with, for example, a noise estimation metric by determining a maximum of two separate noise level estimations: a shaped noise threshold estimation, $T_{NoiseVar}$, and a precursor threshold estimation, $T_{Precursor}$.

A receive noise level may be calculated by processing a periodic receive signal using as noise variance (NV) estimation, which also may be called a shaped noise threshold estimation. A shaped noise threshold estimation may involve a carrier frequency offset compensated in periodic portions of a received preamble, with periods subtracted to create resulting vectors. It may also include averaging amplitude squares of the resulting vectors to obtain an estimate of the receive noise variance. The shaped noise threshold may thus be estimated with the following equation:

$$T_{NoiseVar} = S_{NV} \times \frac{1}{M} \sum_{m=0}^{M-1} |r[n - mN_{period}] - r[n - (m-1)N_{period}]e^{-jn\Delta f}|^2, \quad (1)$$

In Equation (1), r[n] is a received signal, which is referenced to estimate a channel vector after coherent integration, and M is the number of periodic repetitions of a received preamble. The outcome of the integration is scaled by a parameterized scaling factor $S_{NV}$. The factor $S_{NV}$ represents the acquisition margin above a noise floor, and it may be a user-defined value. The factor $S_{NV}$ may be introduced to reduce a probability of false alarm during the leading edge window acquisition stage, discussed below. The factor $\Delta f$ represents a carrier frequency offset.

A precursor portion of a noise level may be the result of band-limited processing and pulse shaping side lobes. A precursor can rise due to self-interference among neighboring channel rays that may be convolved with a pulse shape. A narrow cut-off low pass filter (LPF) on an amplitude of a channel IR, h[n], may be employed to estimate a power of the precursor portion of a channel IR waveform. The LPF may generate a lagged signal waveform that may estimate an envelope of a precursor portion in a channel estimation vector. An inherent lagging in the LPF may prevent a threshold from growing simultaneously with a leading edge of the channel IR and may make the waveform a reliable threshold for capturing the leading edge. The precursor threshold may thus be estimated with the following equation:

$$T_{Precursor} = S_{LPF} \times \text{Filter}_{LPF}\{|h[n]|\}, \quad (2)$$

The filter may be heuristic and may be a second order Butterworth with a programmable cutoff frequency, which may, for example, have a default set to 125 kHz.

In Equation (2), $T_{precursor}$ may be a time-indexed waveform and not a constant number. The waveform may be scaled by a parameterized look-up-table-based, SNR-dependent scaling factor $S_{LPF}$. In order to select an appropriate scaling factor, a number of samples may need to be taken at the LPF input. This may involve aligning a channel IR buffer and centering a maximum channel IR index at the buffer by a circular shift. A number of shifts may be stored and a shift may be reversed after earliest path detection concludes.

A noise level threshold or noise level estimation, which may be utilized for leading edge window acquisition, may be defined as a maximum value of $T_{NoiseVar}$ and $T_{Precursor}$, thus:

$$T_{NoiseLevel} = \max\{T_{NoiseVar}, T_{Precursor}\}, \quad (3)$$

A second stage of earliest path detection may be leading edge window acquisition. Leading edge window acquisition may be used to detect an instance of time where a distribution of channel IR changes due to an appearance of a propagation channel ray in addition to noise. Tools and techniques, which may include a channel energy metric, may capture energy of the channel IR in finite length sliding windows, and, if a cluster energy level is detected, may declare an existence of a channel energy cluster within the window duration.

A channel energy metric may include a non-linear filtering metric, which may use moments of a channel IR for processing, and may be representative of a concentration of channel energy within a window. A channel energy metric may include the following equation:

$$E_{4th/2nd\ Moments} = \frac{\sum_{n=1}^{L_{Window}} |h[n] - \mu_h|^4}{\sum_{n=1}^{L_{Window}} |h[n] - \mu_h|^2}, \quad (4)$$

In Equation (4), $E_{4th/2nd\ Moments}$ represents the channel energy within a window according to a ratio of the fourth and second moments of a waveform based on a square of the amplitude of the channel IR, h[n], where $\mu_h$ is a mean of the complex channel IR within a window duration, and $L_{Window}$ represents a window duration. In addition to an energy capture metric, other functions of channel IR may be employed. For example, for different channel distributions, statistical functions that reflect channel energy value may be applied.

A leading edge window may be identified as soon as, for a first time index within a channel IR buffer, an energy capture metric generates a semi-positive slope that exceeds a determined noise level threshold. For purposes of this description, semi-positive slope is defined with respect to a shift register buffer with a programmable number of registers, $k_{edge}$, having a default value of four (4) registers and bounded by a maximum of eight (8) registers. A semi-positive slope exists when a differential energy capture in the shift register is always greater than a ramp indicator, thus:

$$\frac{E_{Metric}[n]-E_{Metric}[n-1]}{\max\{E_{Metric}[n], \ldots, E_{Metric}[n-k_{edge}]\}} \geq S_{Margin}, \ldots, \quad (6)$$

$$\frac{E_{Metric}[n-k_{edge}+1]-E_{Metric}[n-k_{edge}]}{\max\{E_{Metric}[n], \ldots, E_{Metric}[n-k_{edge}]\}} \geq S_{Margin},$$

In Equation (6), $E_{Metric}$ refers to an output of any energy capture metric, and $S_{Margin}$ is a slope indicator, which is defined as parameterized margin, which may have a default value of −0.01.

A third stage of earliest path detection may be a peak search. A peak search may involve determining a time of arrival or a time instance associated with a channel IR leading ray within a peak search window, which may be an expanded leading edge window. An expanded leading edge window may be an extension of an identified leading edge window. In some cases, a bandwidth limitation of a channel IR and pulse shaping effects may result in an energy capture metric output that indicates a semi-positive slope on a leading edge slope before an actual leading edge channel ray arrives at a register buffer. In order to remedy this, the leading edge may be extended by allowing signal samples to accumulate in a shift register buffer after the leading edge window has been identified. For example, a shift register buffer in which a peak search is performed may be twice the length of a leading edge window, or 2 $L_{Window}$.

Within a peak search window, distinguishable peaks may be detected with a peak search metric. A distinguishable peak may be a channel IR sample with amplitude greater than or equal to an amplitude of its neighboring samples within a window, $L_{peak}$, of a user-defined number of samples. An earliest peak may be selected from the distinguishable peaks, where a leading ray of a channel IR represents the earliest peak, and which may be indexed $n^*_{peak}$. This index may be used to estimate and/or determine a time of arrival of a signal.

In some cases, a fat-path correction metric may be applied to account for unrecoverable channel path related to channel characteristics. Those skilled in the art will recognize that, if two or more channel IR samples in a continuous time realization fall into one discrete time sampling interval, a receiver may sense all of the samples as one complex sample that may be a randomly phased accumulation of an original path. Such paths may not always be detected as distinguishable peaks. Fat-path correction may detect and account for such an accumulation and may adjust a declared earliest path sample index accordingly.

A fat-path detection metric may be based on a derivative of a channel IR amplitude:

$$h_{Deriv}[n]=|h[n]|-|h[n-1]|, \quad (7)$$

Within a peak search window, a user-defined number of peaks may be evaluated, for example up to ten (10) peaks prior a maximum peak, and a fat-path window may be defined as $L_{FatWindow}$, which is a window that includes the user-defined number of peaks, $n_{Fat}$. A fat-path sample may be defined as a sample within the fat-path window in which the derivative of the channel IR is smaller than a scaled version of a maximum sample within the window:

$$h_{Deriv}[n_{Fat}]\leq S_{FatPath}\max\{|h[n^*_{peak}-L_{FatWindow}]|, \ldots, |h[n^*_{peak}]|\}, \quad (8)$$

A fat path may be valid if its amplitude is greater than a leading edge window noise threshold. Among a possible number of fat paths, an earliest occurrence may be selected and a leading edge sample index may be adjusted based on a corresponding detected fat path index.

In some cases, conditions may exist such that multiple iterations of the described tools and techniques need to be applied in order to reach a desired solution. Some of the parameters discussed above may be varied in order to adjust sensitivity to certain conditions. For example, a leading edge window acquisition buffer may have scanned all available channel IR samples without acquiring an index. This may indicate that a noise level scaling factor may need to be reduced. In an iterative fashion, this process may need to be repeated until a leading edge window may be identified.

In some instances, a minimum acceptable peak level may be set as an amplitude of an earliest channel ray. If a detected peak is smaller than a set minimum acceptable peak, a false alarm condition may occur. This may indicate that a noise level scaling factor may need to be increased. Again, this process may need to be repeated until a leading edge window may be identified.

According to some embodiments, system parameters are adjustable and the system is subject to an automatic re-run condition(s) based upon one or more automatic re-run conditions. For example, a system may output a signal that is not usable, or a system may not detect a UWB signal over a noise floor. These conditions may be automatic re-run conditions that may trigger automatic parameter adjustment. In this way, a closed-loop process for earliest path detection may be implemented. For example, the amplitude of the earliest channel ray may be measured and compared to a maximum channel impulse response peak and to an estimated noise level. Based on this, a noise level threshold may be adjusted while the energy capture metric is applied. Additionally or alternatively, any or all of the following factors may be adjusted: the leading edge acquisition window duration, the ratio of a maximum earliest channel path to a received signal, the fat-path search window duration, and/or a slope level for determining an inflection point as a fat-path indicator.

Figure 2A:
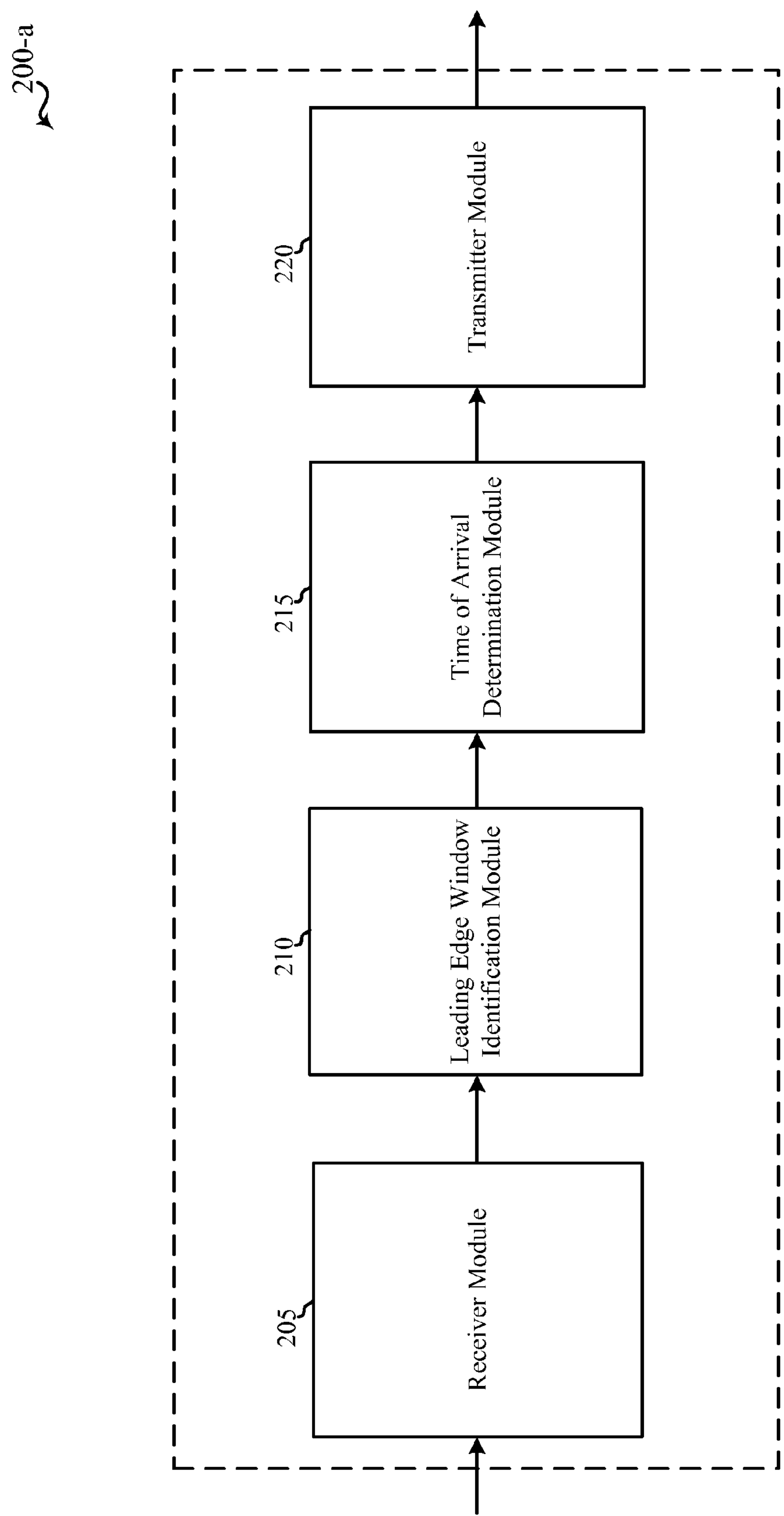
FIGS. 2A and 2B show block diagrams of exemplary devices that may be employed in location tracking systems.

Turning now to FIG. 2A, a block diagram illustrates a device 200-*a* configured for earliest path detection in accordance with various embodiments. The device 200-*a* may be an example of one or more aspects of the APs 105 and/or tracking management server 150 described with reference to FIGS. 1A and/or 1B. The device 200-*a* may also be a processor. The device 200-*a* may include a receiver module 205, a leading edge window identification module 210, a time of arrival determination module 215, and/or a transmitter module 220. Each of these components may be in communication with each other.

The components of the device 200-*a* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The device 200-*a*, through the receiver module 205, may receive a UWB signal from one or more tags (e.g., tags 115) and/or from one or more APs (e.g., APs 105). The device 200-*a*, through the leading edge identification module 210, may identify a leading edge window of a received UWB signal. The leading edge identification module 210 may include a channel energy metric, which the leading edge identification module 210 may use to determine a channel IR energy level. This may be used in combination with a noise estimation level to identify a leading edge window. The leading edge may be identified when the energy capture metric generates a semi-positive slope that exceeds a determined noise threshold or a noise estimation level. The device 200-*a* may, through the time of arrival determination module 215, determine a time of arrival of the UWB signal, which may involve a peak search module. The device 200-*a*, through the transmitter module 220, may transmit a determined time of arrival to an AP 105 and/or to the tracking management server 150.

Figure 2B:
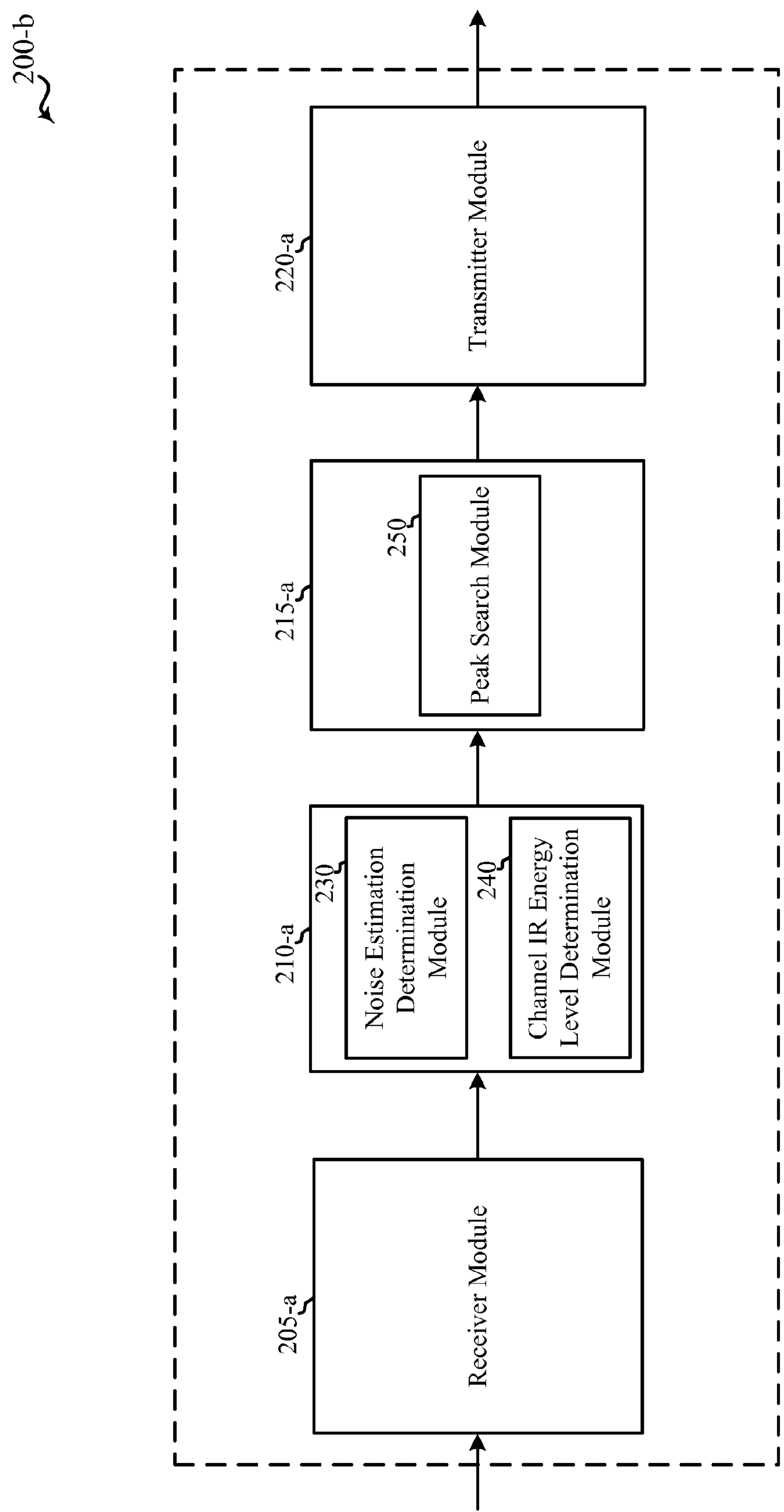

Next, FIG. 2B shows a block diagram of a device 200-*b* configured for earliest path detection in accordance with various embodiments. The device 200-*b* may be an example of the device 200-*a* of FIG. 2A and may perform the same or similar functions as those described above for the device 200-*a*. The device 200-*b* may be an example of one or more aspects of the APs 105 and/or the tracking management servers 150 described with reference to FIGS. 1A, 1B, and/or 2A. The device 200-*b* may also be a processor. The device 200-*b* may include a receiver module 205-*a*, a leading edge window identification module 210-*a*, a time of arrival determination module 215-*a*, and/or a transmitter module 220-*a*, which may be examples of their corresponding modules in FIG. 2A. The leading edge window identification module 210-*a* may include a noise estimation module 230 and/or a channel IR energy level determination module 240. The time of arrival determination module 215-*a* may include a peak search module 250. Each of the components may be in communication with each other.

The components of the device 200-*b* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The noise estimation determination module 230 may include a noise estimation metric, which may determine a noise estimation level above which a received UWB signal may be detectable. The noise estimation metric may select a maximum value from two or more noise estimations, which may include a shaped noise estimation and a precursor threshold estimation.

The channel IR energy level determination module 240 may include a channel energy metric, which may determine a channel IR energy level. The channel IR energy metric may indicate the channel IR energy level in finite length sliding windows and/or indicate the existence of a channel cluster within a window duration. The channel energy metric may include, or may be based on, a ratio of a fourth moment and a second moment of the channel IR.

The peak search module 250 may include a peak search metric, which may determine the time of arrival of a signal path. The peak search metric may include a maximum peak search metric, which may be applied to each of the channel IR, the noise estimation level and the leading edge window. The peak search metric may include a fat-path correction metric, which may be applied to each of the channel IR and the output of the maximum peak search metric.

Figure 3:
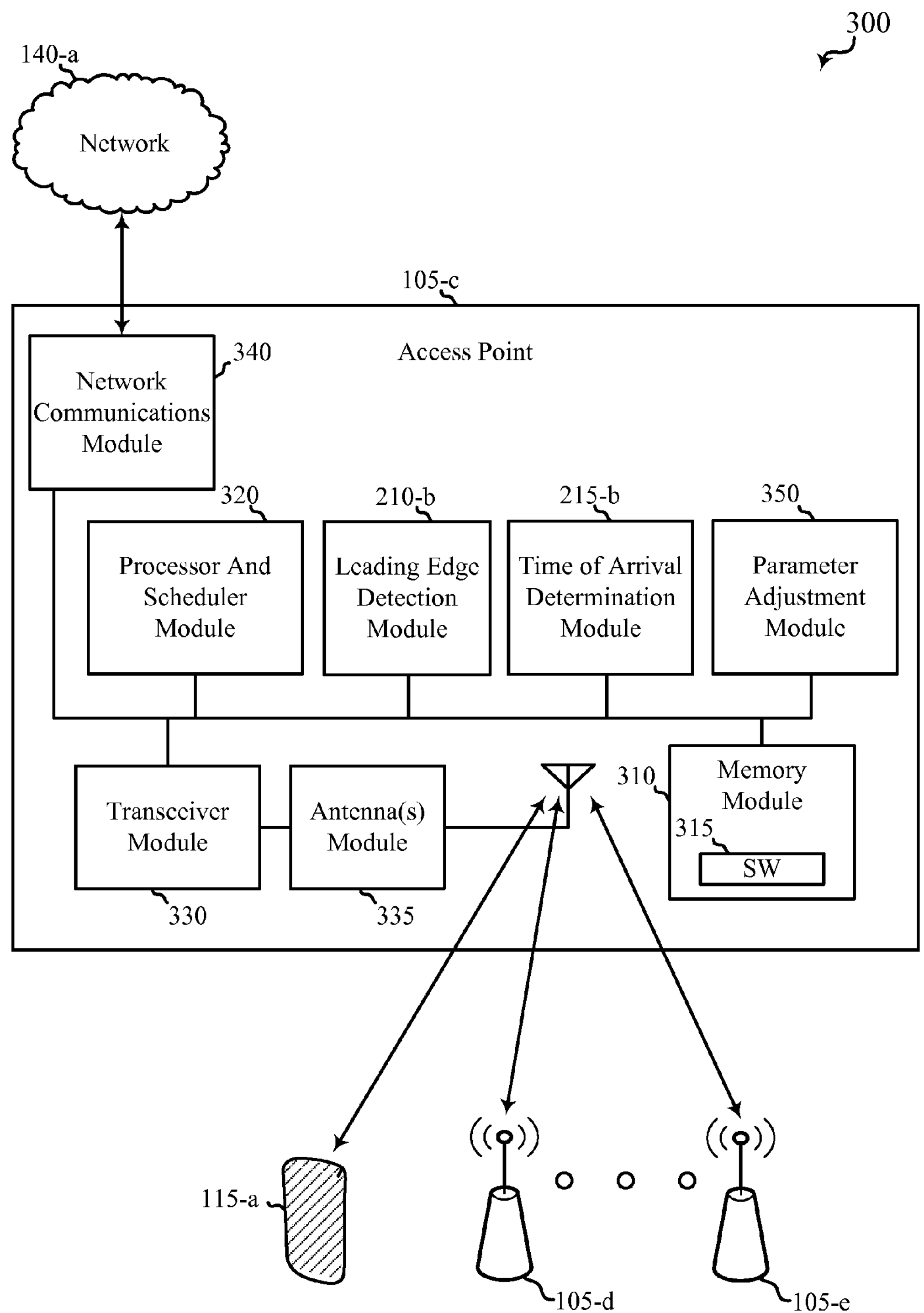
FIG. 3 shows a block diagram of an exemplary location tracking system.

Turning to FIG. 3, shown is a block diagram illustrating a system 300 configured for earliest channel path detection in accordance with various embodiments. The system 300 may include AP 105-*c*, which may be an example of one or more aspects of the APs 105 described with reference to FIGS. 1A, 1B, 2A, and/or 2B. The AP 105-*c* may include a memory module 310, which may include a software module 315. The AP 105-*c* may include a processor and scheduler module 320, a transceiver module 330, antenna(s) module 335, a network communications module 340, a parameter adjustment module 350, a leading edge detection module 210-*b*, and a time of arrival determination module 215-*b*. Each of these components may be in communication with each other. The network communications module 340 may be in communication with the network 140-*a*. The leading edge detection module 210-*b* and the time of arrival determination module 215-*b* may be examples of the corresponding modules in FIGS. 2A and 2B.

In some embodiments, the parameter adjustment module 350 may be configured to automatically, or with user input, adjust parameters of various metrics described above. The parameters may be adjusted to alter sensitivity to noise. The metrics with parameters that may be adjusted by the parameter adjustment module 350 may include: the noise estimation metric, the channel energy metric, the peak search metric, the maximum peak search metric, and the fat-path correction metric.

The memory module 310 may include random access memory (RAM) and read-only memory (ROM). The memory module 310 may also store computer-readable, computer executable software (SW) code 315 containing instructions configured to, when executed, cause the processor and scheduler module 320 to perform various functions described herein related to time of arrival determination, leading edge window identification, channel IR energy level determination, and/or noise estimation level determination. Alternatively, the software (SW) code 315 may not be directly executable by the processor and scheduler module 320 but may be configured to cause a computer, e.g., when compiled and executed, to perform the functions described herein.

The processor and scheduler module 320 may include an intelligent hardware device, e.g., a central processing unit (CPU). The processor and scheduler module 320 may perform various operations associated with earliest channel path detection, time of arrival determination, leading edge window identification, channel IR energy level determination, and/or noise estimation level determination. The processor and scheduler module 320 may use scheduling information received from, for example, the tracking management server 150, by way of the network 140-*a*, which may be an example of the network 140 in FIGS. 1A and 1B and the network communications module 340, to determine whether the leading edge detection module 210-*b* and/or the time of arrival determination module 215-*b* should be applied to a UWB signal received by the transceiver module 330 via the antenna(s) module 335. The processor and scheduler module 320 may perform various operations associated with reception and processing UWB signals, including time of arrival determination, leading edge window identification, channel IR energy level determination, and/or noise estimation level determination.

The transceiver module 320 may include a modem configured to modulate data (e.g., packets) and provide the modulated data to the antenna(s) module 335 for transmission, and to demodulate data received, including a UWB signal(s) from a tag, from the antenna(s) module 335. While some examples of AP 105-*c* may include a single antenna, AP 105-*c* may include multiple antennas. As shown in FIG. 3, UWB signals transmitted from a tag 115-*a* may be received by the AP 105-*c* through the antenna(s) in the antenna(s) module 335. In some embodiments, the AP 105-*c* may convey information to the tag unit 115-*a* through the antenna(s) module 335. The AP 105-*c* may also wirelessly communicate with other APs, such as, for example, APs 105-*d* through 105-*e*. The AP 105-*c* may receive signals, including reference signals from other APs 105, which the AP 105-*c* may use for triangulation and/or trilateration in determining a location of a tag or tag unit 115. Alternatively, the AP 105-*c* may receive reference signals from APs 105, and the AP 105-*c* may via the network communications module 340 and the network 140-*a*, transmit the received reference signals to a tracking management server 150.

Figure 4:
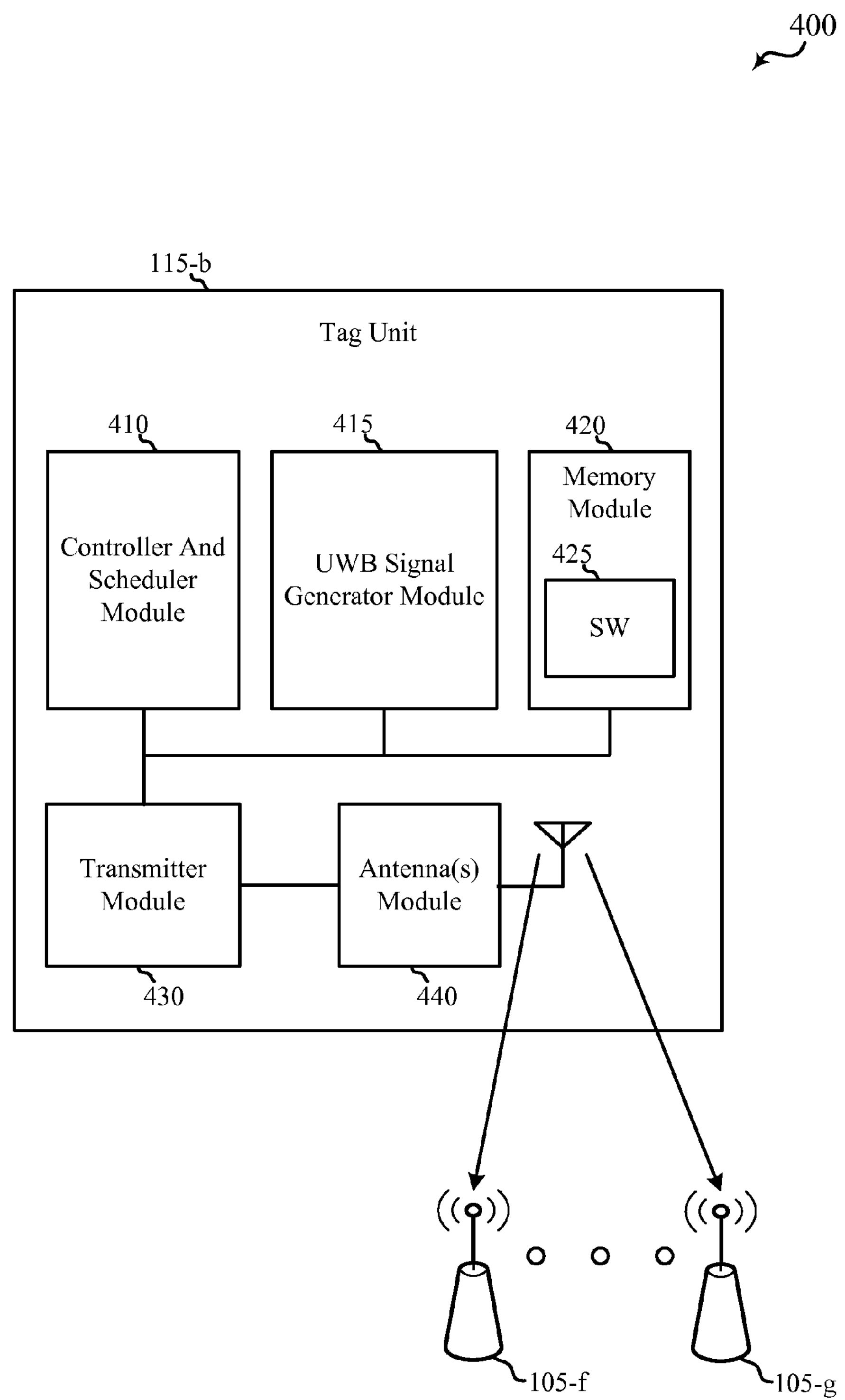
FIG. 4 shows a block diagram of an exemplary location tracking system.

FIG. 4 is a block diagram illustrating a system 400, which may include a tag unit 115-*b*, that may be an example of the tags or tag units 115 of FIGS. 1A, 1B, and/or 3. The tag unit 115-*b* may include a controller and scheduler module 410, a memory module 420, a transmitter module 430, and antenna(s) module 440. The tag unit 115-*b* may also include a UWB signal generator module, which may generate UWB signals for transmission to APs 105. Although not shown in FIG. 4, the tag unit 115-*b* may also include a battery that enables the tag unit 115-*b* to be used as a battery-operated device. Each of these components may be in communication with each other.

The controller and scheduler module 410 may include logic and/or code that enables it to control the operations of the tag unit 115-*b*. For example, the controller and scheduler module 410 may include a microcontroller or a state machine to control the UWB signal generator module 415.

The memory module 420 may include random access memory (RAM) and/or read-only memory (ROM). The memory module 320 may also store computer-readable, computer-executable software (SW) code 425 containing instructions that are configured to, when executed, cause the controller and scheduler module 410 to perform various functions described herein for controlling the tag unit 115-*b*. Alternatively, the software code 425 may not be directly executable by the controller and scheduler module 410 but may be configured to cause a computer, e.g., when compiled and executed, to perform functions described herein.

The transmitter module 430 may support radio frequency (RF) communication technology to broadcast UWB signals through the antenna(s) module 440. For example, the transmitter module 430 may include a modulator (not shown) to modulate ranging information and provide the modulated ranging information to the antenna(s) module 440 for transmission of UWB signals. As shown in FIG. 4, the broadcast of UWB signals from the tag unit 115-*b* may be received by one or more APs 105. In this example, the tag unit 115-*b* is shown broadcasting UWB signals to APs 105-*f* through 105-*g*. In some embodiments, a tag unit may be equipped with a receiver or transceiver module to enable the tag unit to receive signals from the APs 105.

Figure 5:
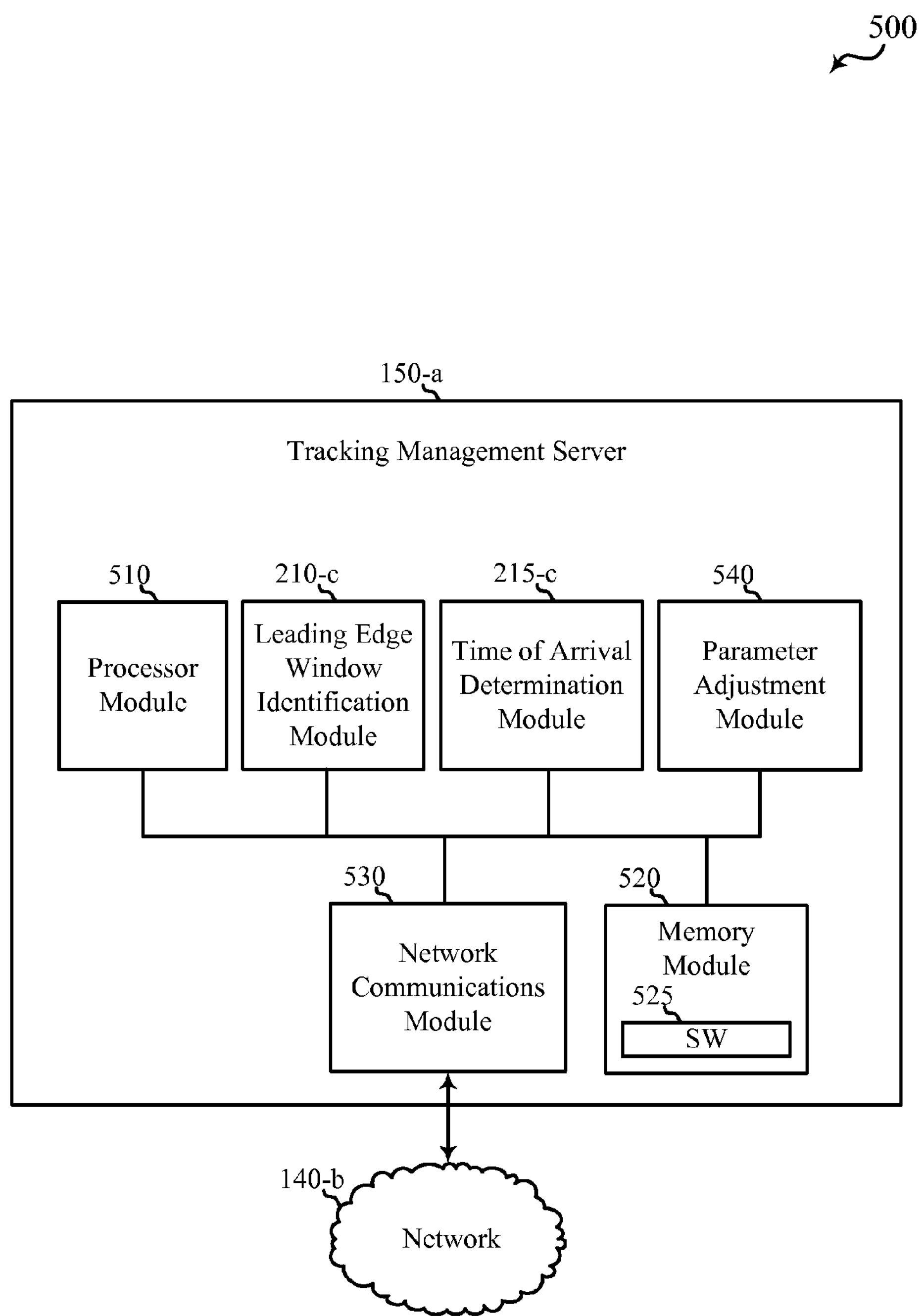
FIG. 5 shows a block diagram of an exemplary location tracking system.

Now turning to FIG. 5, a block diagram illustrates a system 500, which may include a tracking management server 150-*a* that may directly or indirectly control earliest channel path detection in accordance with some embodiments. The tracking management server 150-*a* may be an example of one or more aspects of the tracking management server 150 described with reference to FIGS. 1A and/or 1B. The server 150 may be an example of the device described in FIGS. 2A and/or 2B. The tracking management server 150-*a* may include a processor module 510, a memory module 520, a network communications module 530, a parameter adjustment module 540, a leading edge window identification module 210-*c*, and/or a time of arrival determination module 215-*c*. The leading edge window identification module 210-*c* may be an example of the leading edge identification modules 210 and 210-*b* of FIGS. 2A and 2B, respectively. The time of arrival determination module 215-*c* may be an example of the time of arrival determination module 215 and 215-*b* of FIGS. 2A and 2B, respectively. Each of these components may be in communication with each other.

The processor module 510 may also perform various operations and may include an intelligent hardware device, e.g., a CPU. The processor module 510 may perform various operations associated with time of arrival determination, leading edge window identification, channel IR energy level determination, and/or noise estimation level determination. For example, the processor module 510 may, based earliest path detection at a number of APs 105, determine one or more times of arrival. Alternatively, the processor 510 may facilitate receiving signals from tag units 115 by way of APs 105, and the processor may identify a leading edge window and determine time of arrival of a signal received at one or more APs 105 from one or more tag units 115. In some cases, the tracking management server 150-*a* may communicate with a network 140-*b* through the network communications module 530 to receive information from the APs 105 and/or send information to the APs 105. The network 140-*b* may be an example of the networks 140 of FIGS. 1A, 1B, and/or FIG. 3.

The memory module 520 may include RAM and ROM. The memory module 520 may also store computer-readable, computer-executable software code 525 containing instructions that are configured to, when executed, cause the processor module 510 to perform various functions described herein. Alternatively, the software code 525 may not be directly executable by the processor module 510 but may be configured to cause a computer, e.g., when compiled and executed, to perform functions described herein.

The parameter adjustment module 540 may be configured to automatically, or with user input, adjust parameters of various metrics described above. The parameters may be adjusted to alter sensitivity to noise. In some embodiments, the parameter adjustment module is configured to automatically re-run operations subject to one or more conditions, and the module may adjust parameters including: a ratio of a measured earliest channel path amplitude and maximum channel impulse response; estimated noise level; noise level thresholds; leading edge window duration; fat-path search window duration; and/or a slope level for determining an inflection point as a fat path indicator. The parameter adjustment module 540 may, via the processor module 510, the network communications module 530, and the network 140-*b*, communicate various parameter adjustments to the APs 105. The metrics with parameters that may be adjusted by the parameter adjustment module 540 may include: the noise estimation metric, the channel energy metric, the peak search metric, the maximum peak search metric, and the fat-path correction metric.

Figure 6:
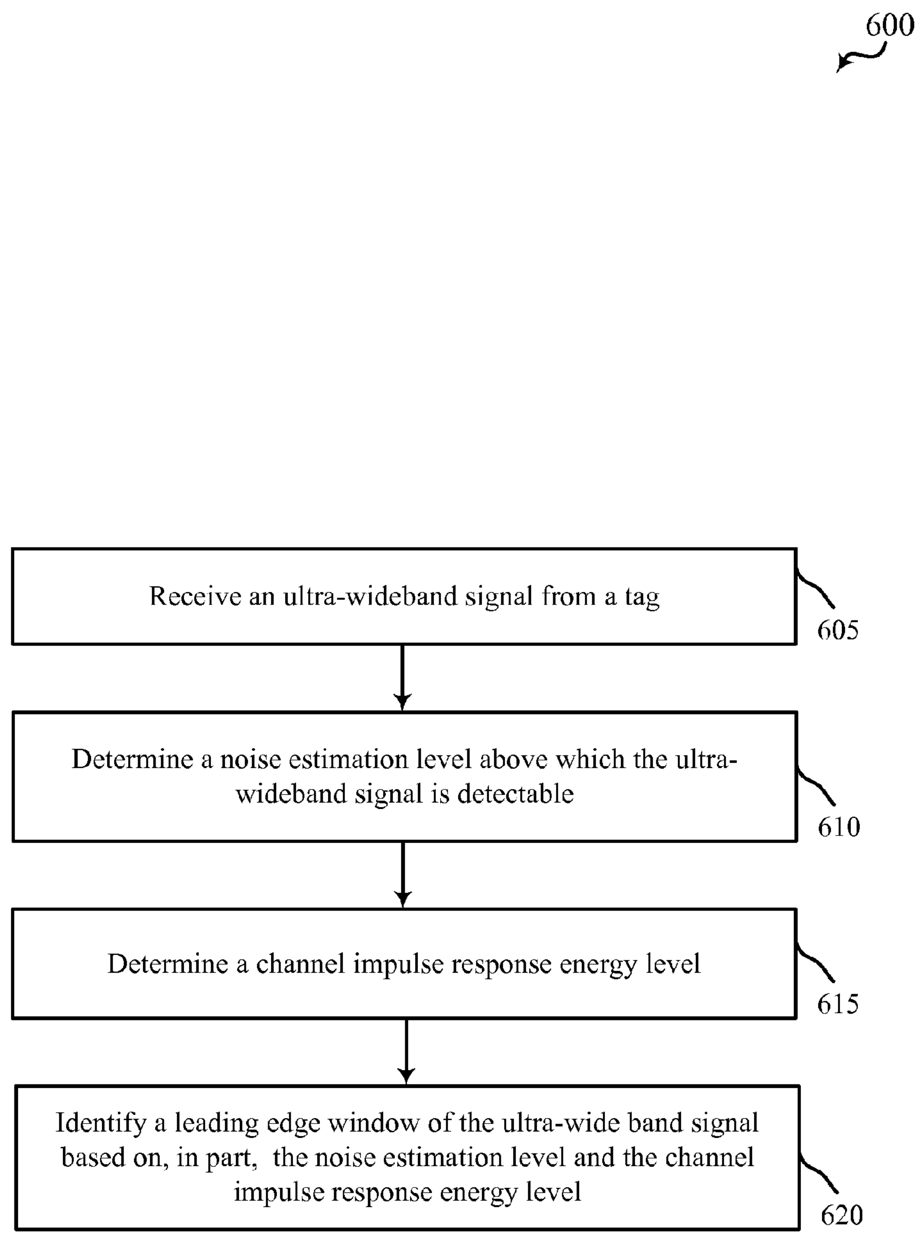
FIG. 6 is a flow diagram of a method for locating tracking in a location tracking system.

Referring now to FIG. 6, a flow diagram is shown, which illustrates a method 600 of location tracking using earliest channel path detection according to some embodiments. The method 600 may be implemented using, for example, the devices 200-*a*, 200-*b*, 300, 400, and 500 of FIGS. 2A, 2B, 3, 4, and 5, respectively; the APs 105 of FIGS. 1A, 1B, 3, and 4; the tag units 115 of FIGS. 1A, 1B, 3, and 4; the tracking management servers 150 of FIGS. 1A, 1B, 3, 4, and 5; and/or the system 100 of FIGS. 1A and 1B.

At block 605, an AP 105 may receive an UWB signal from a tag or tag unit 115. At block 610, a noise estimation metric may be used to determine a noise threshold or noise estimation level above which the UWB signal is detectable. The noise estimation metric may select the maximum value of a shaped noise estimation and a precursor threshold estimation. At block 615, a channel energy metric may be used to determine a channel IR energy level. The channel energy metric may indicate the channel IR energy level in finite length sliding windows and may indicate the existence of a channel cluster within the window duration. The channel energy metric may include or be based on a ratio of a fourth moment and a second moment of the channel IR. At block 620, a leading edge window of the UWB signal may be identified, which may be based on, at least in part, the noise estimation level and the channel IR energy level. Identifying the leading edge window may include detecting a time when the channel IR energy level has a semi-positive slope that exceeds the noise estimation level.

It should be noted that the method 600 is just one implementation and that the operations of the method 600 may be rearranged or otherwise modified such that other implementations are possible.

Figure 7:
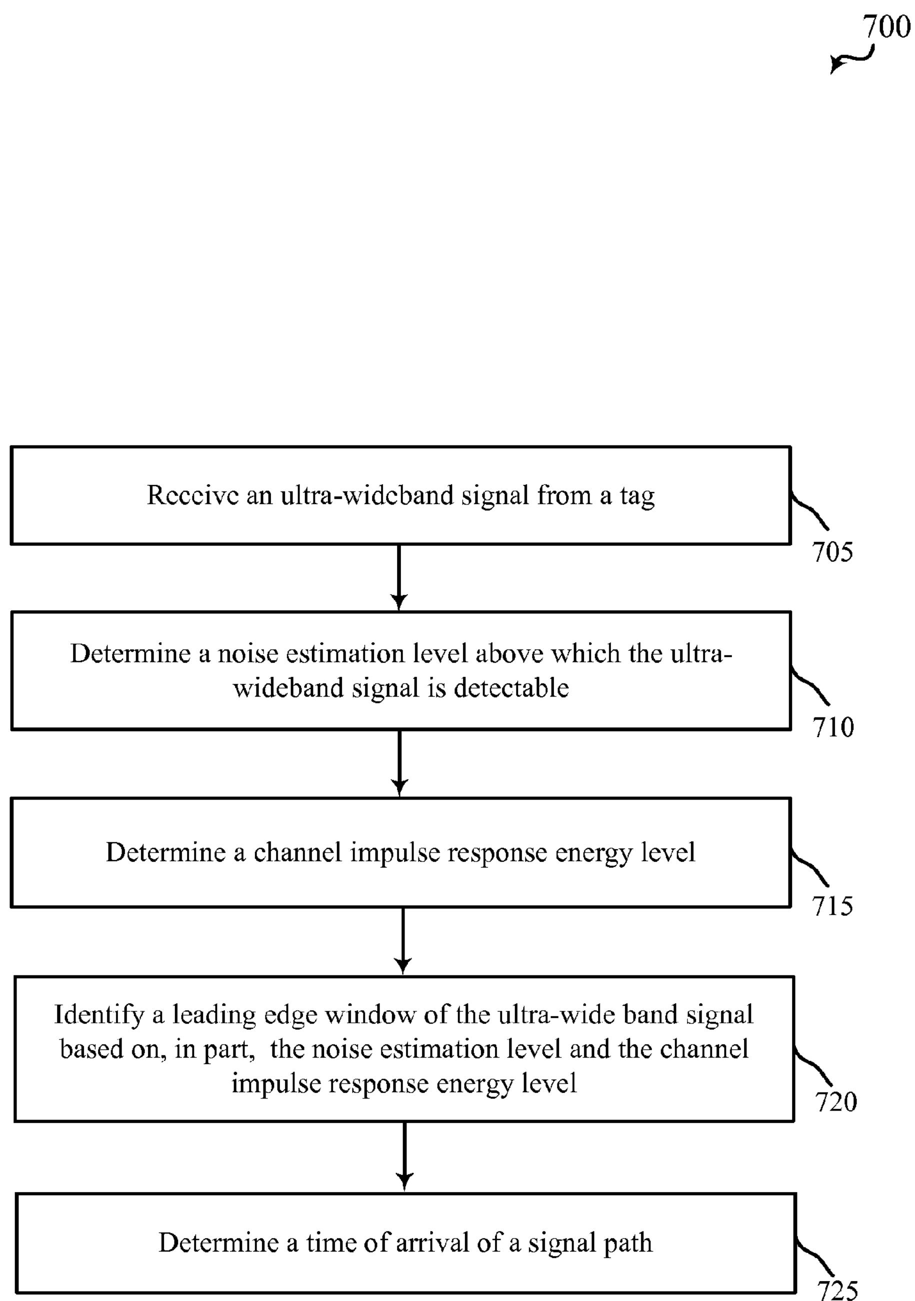
FIG. 7 is a flow diagram of a method for location tracking in a location tracking system.

FIG. 7 shows a flow diagram that illustrates a method 700 of location tracking using earliest channel path detection according to some embodiments. The method 700 may be implemented using, for example, the devices 200-*a* and 200-*b* of FIGS. 2A and 2B, respectively; the APs 105 of FIGS. 1A, 1B, 3, and 4; the tag units 115 of FIGS. 1A, 1B, 3, and 4; the tracking management servers 150 of FIGS. 1A, 1B, 3, 4, and 5; and/or the systems 100, 300, 400, and 500 of FIGS. 1A and 1B, 3, 4, and 5, respectively.

At block 705, an AP 105 may receive an UWB signal from a tag or tag unit 115. At block 710, a noise estimation metric may be used to determine a noise threshold or noise estimation level above which the UWB signal is detectable. The noise estimation metric may select the maximum value of a shaped noise estimation and a precursor threshold estimation.

At block 715, a channel energy metric may be used to determine a channel IR energy level. The channel energy metric may indicate the channel IR energy level in finite length sliding windows and may indicate the existence of a channel cluster within the window duration. The channel energy metric may include or be based on a ratio of a fourth moment and a second moment of the channel IR.

At block 720, a leading edge window of the UWB signal may be identified, which may be based on, at least in part, the noise estimation level and the channel IR energy level. Identifying the leading edge window may include detecting a time when the channel IR energy level has a semi-positive slope that exceeds the noise estimation level. At block 725, a peak search metric may determine a time of arrival of a signal path. The peak search metric may involve a maximum peak search metric that may be applied to the channel IR, the noise estimation level, and/or the leading edge window. The peak search metric may also involve a fat-path correction metric that may be applied to the channel IR and the output of the maximum peak search metric.

It should be noted that the method 700 is just one implementation and that the operations of the method 700 may be rearranged or otherwise modified such that other implementations are possible.

Figure 8:
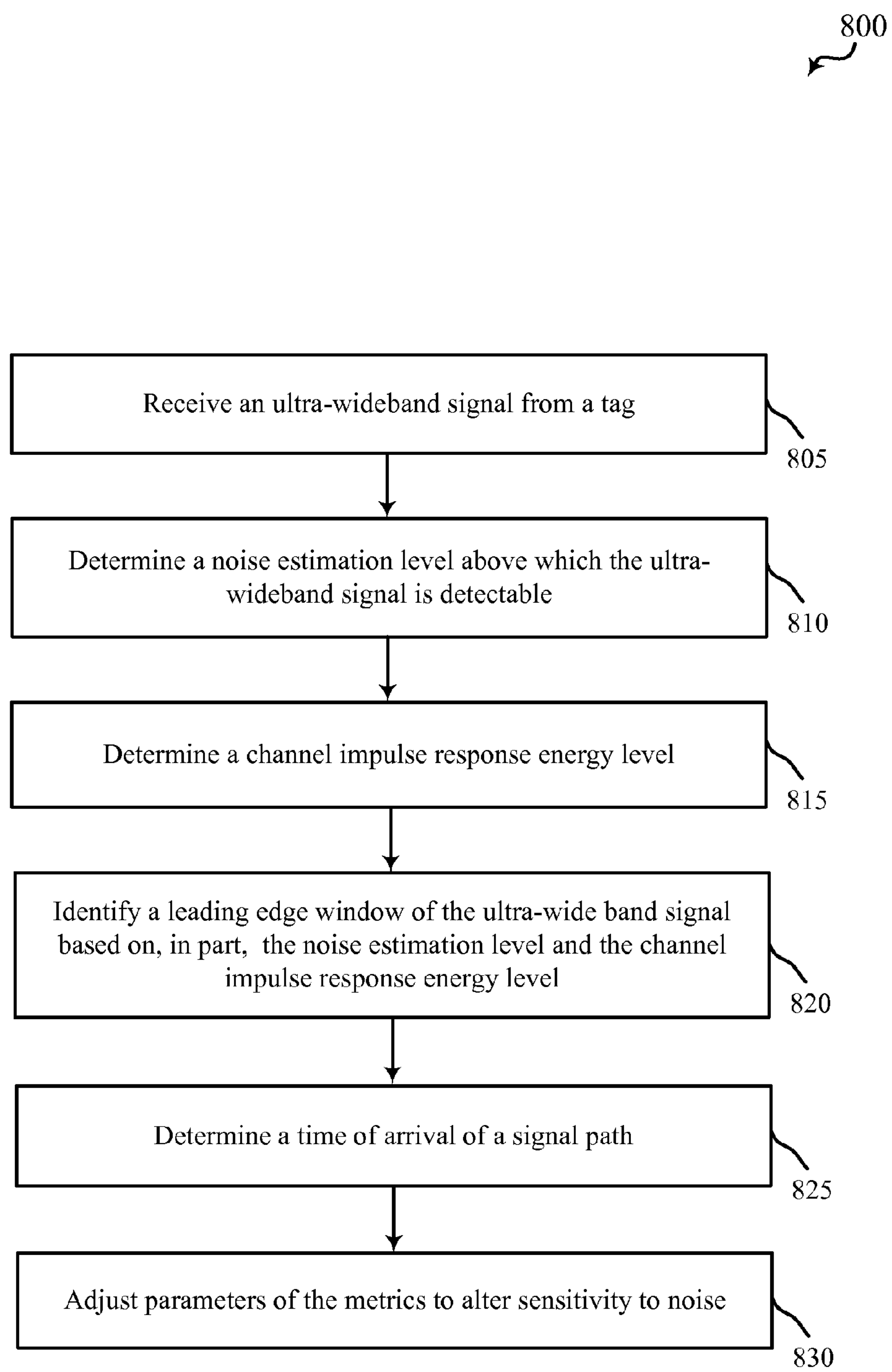
FIG. 8 is a flow diagram of a method for location tracking in a location tracking system.

Next, FIG. 8 shows a flow diagram that illustrates a method 800 of location tracking using earliest channel path detection according to some embodiments. The method 800 may be implemented using, for example, the devices 200-*a* and 200-*b* of FIGS. 2A and 2B, respectively; the APs 105 of FIGS. 1A, 1B, 3, and 4; the tag units 115 of FIGS. 1A, 1B, 3, and 4; the tracking management servers 150 of FIGS. 1A, 1B, 3, 4, and 5; and/or the systems 100, 300, 400, and 500 of FIGS. 1A and 1B, 3, 4, and 5, respectively.

At block 805, an AP 105 may receive an UWB signal from a tag or tag unit 115. At block 810, a noise estimation metric may be used to determine a noise threshold or noise estimation level above which the UWB signal is detectable. The noise estimation metric may select the maximum value of a shaped noise estimation and a precursor threshold estimation.

At block 815, a channel energy metric may be used to determine a channel IR energy level. The channel energy metric may indicate the channel IR energy level in finite length sliding windows and may indicate the existence of a channel cluster within the window duration. The channel energy metric may include or be based on a ratio of a fourth moment and a second moment of the channel IR.

At block 820, a leading edge window of the UWB signal may be identified, which may be based on, at least in part, the noise estimation level and the channel IR energy level. Identifying the leading edge window may include detecting a time when the channel IR energy level has a semi-positive slope that exceeds the noise estimation level. At block 825, a peak search metric may determine a time of arrival of a signal path. The peak search metric may involve a maximum peak search metric that may be applied to the channel IR, the noise estimation level, and/or the leading edge window. The peak search metric may also involve a fat-path correction metric that may be applied to the channel IR and the output of the maximum peak search metric. At block 830, the parameters of the metrics may be adjusted to alter sensitivity of the metrics to noise.

It should be noted that the method 800 is just one implementation and that the operations of the method 800 may be rearranged or otherwise modified such that other implementations are possible.

Figure 9:
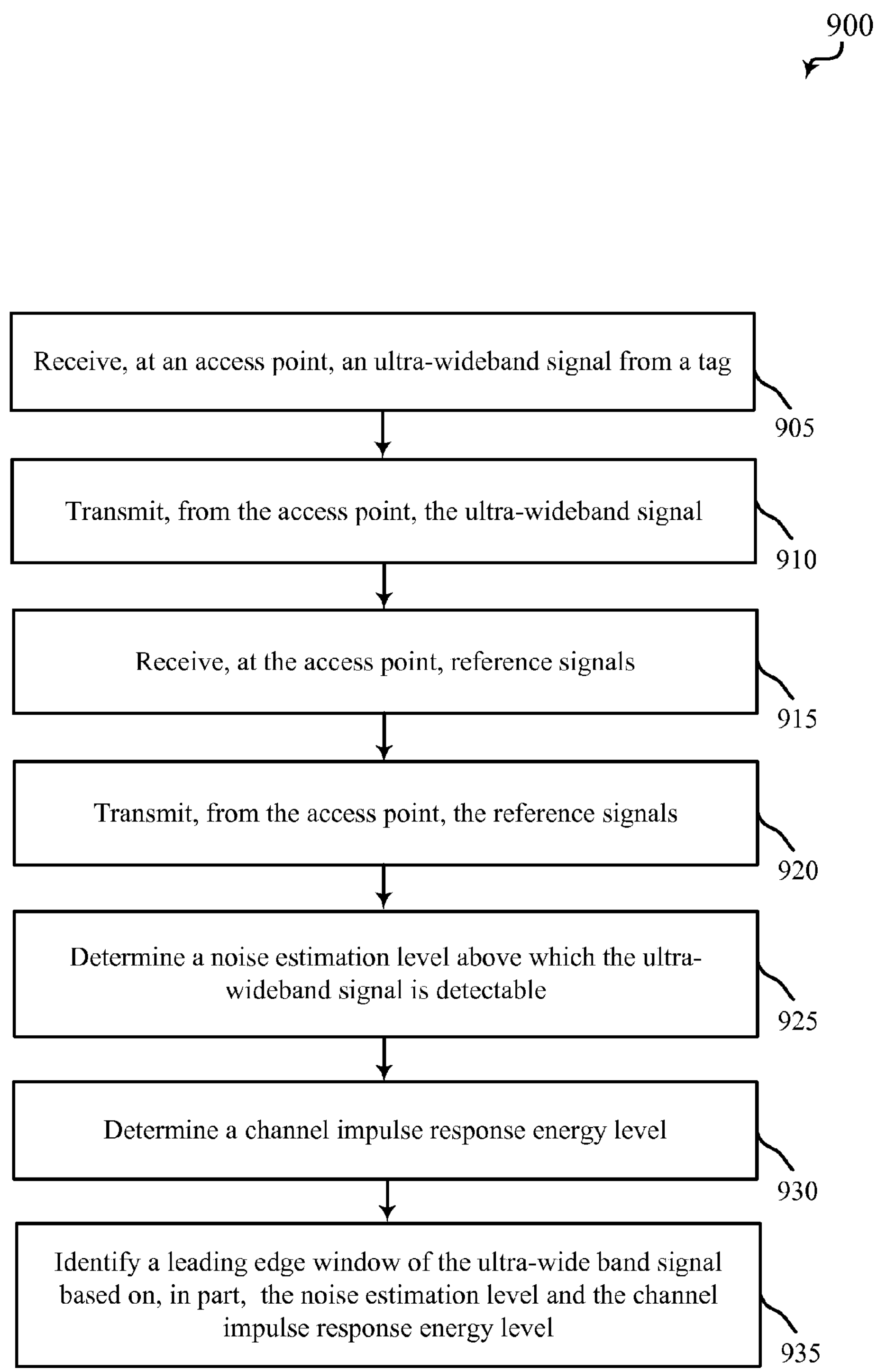
FIG. 9 is a flow diagram of a method for location tracking in a location tracking system.

FIG. 9 shows a flow diagram that illustrates a method 900 of location tracking using earliest channel path detection according to some embodiments. The method 900 may be implemented using, for example, the devices 200-*a* and 200-*b* of FIGS. 2A and 2B, respectively; the APs 105 of FIGS. 1A, 1B, 3, and 4; the tag units 115 of FIGS. 1A, 1B, 3, and 4; the tracking management servers 150 of FIGS. 1A, 1B, 3, 4, and 5; and/or the systems 100, 300, 400, and 500 of FIGS. 1A and 1B, 3, 4, and 5, respectively.

At block 905, an AP 105 may receive an UWB signal from a tag or tag unit 115. At block 910, the AP 105 may transmit the UWB signal to a tracking management server 150. At block 915, the AP 105 may receive references signals, which may, for example, be signals from other APs 105, and which may be used in a triangulation and/or trilateration.

At block 920, the AP 105 may transmit the reference signals to the tracking management server 150. At block 925, a noise estimation metric may be used to determine a noise threshold or noise estimation level above which the UWB signal is detectable. The noise estimation metric may select the maximum value of a shaped noise estimation and a precursor threshold estimation. The noise estimation metric may be an aspect of the tracking management server 150.

At block 930, a channel energy metric may be used to determine a channel IR energy level. The channel energy metric may indicate the channel IR energy level in finite length sliding windows and may indicate the existence of a channel cluster within the window duration. The channel energy metric may include or be based on a ratio of a fourth moment and a second moment of the channel IR. The channel energy metric may be an aspect of the tracking management server 150.

At block 935, a leading edge window of the UWB signal may be identified, which may be based on, at least in part, the noise estimation level and the channel IR energy level. Identifying the leading edge window may include detecting a time when the channel IR energy level has a semi-positive slope that exceeds the noise estimation level. The leading edge may be identified at or by an aspect of the tracking management server 150. The method 900 may further include aspects of methods 700 and 800, including, for example, a time of arrival determination step and/or a parameter adjustment step.

It should be noted that the method 900 is just one implementation and that the operations of the method 900 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method for location tracking, the method comprising:

receiving, at an access point (AP), an ultra-wideband (UWB) signal from a tag;

determining, with a noise estimation metric, a noise estimation level above which the UWB signal is detectable;

determining, with a channel energy metric, a channel impulse response (IR) energy level; and identifying a leading edge window of the UWB signal based at least in part on the noise estimation level and the channel IR energy level.

2. The method of claim 1, wherein determining the noise estimation level comprises selecting a maximum value of: a shaped noise estimation and a precursor threshold estimation.

3. The method of claim 1, wherein the channel energy metric indicates the channel IR energy level in finite length sliding windows and indicates an existence of a channel cluster within a window duration.

4. The method of claim 1, wherein the channel energy metric comprises a ratio of a fourth moment and a second moment of a channel IR.

5. The method of claim 1, wherein the identifying the leading edge window comprises detecting a time when the channel IR energy level has a semi-positive slope that exceeds the noise estimation level.

6. The method of claim 1, further comprising:

detecting, with a peak search metric, distinguishable peaks within a peak search window, wherein the peak search window is identified based at least in part on the identified leading edge window; and determining a time of arrival of a signal path based at least in part on the detected peaks.

7. The method of claim 6, wherein determining the time of arrival comprises:

applying a maximum peak search metric to at least a channel IR, the noise estimation level, and the leading edge window; and applying a fat-path correction metric to at least the channel IR and an output of the maximum peak search metric.

8. The method of claim 1, further comprising:

adjusting parameters of the noise estimation and channel energy metrics to alter sensitivity to noise.

9. The method of claim 1, wherein parameters of one or more of the noise estimation and channel energy metrics are automatically adjusted subject to one or more automatic re-run conditions.

10. The method of claim 1, further comprising:

transmitting, from the AP to a tag tracking management server, the UWB signal.

11. The method of claim 10, further comprising:

receiving, at the AP, a plurality of reference signals from a plurality of reference points, the reference signals for locating the tag using at least one of triangulation and trilateration.

12. The method of claim 11, further comprising:

transmitting, from the AP to the tag tracking management server, the plurality of reference signals.

13. A system for location tracking, the system comprising:

means for receiving, at an access point (AP), an ultra-wideband (UWB) signal from a tag;

means for determining, with a noise estimation metric, a noise estimation level above which the UWB signal is detectable;

means for determining, with a channel energy metric, a channel impulse response (IR) energy level; and means for identifying a leading edge window of the UWB signal based at least in part on the noise estimation level and the channel IR energy level.

14. The system of claim 13, wherein the means for determining the noise estimation level comprises means for selecting a maximum value of: a shaped noise estimation and a precursor threshold estimation.

15. The system of claim 13, wherein the channel energy metric indicates the channel IR energy level in finite length sliding windows and indicates an existence of a channel cluster within a window duration.

16. The system of claim 13 , wherein the channel energy metric comprises a ratio of a fourth moment and a second moment of a channel IR.

17. The system of claim 13, wherein the means for identifying the leading edge window comprises means for detecting a time when the channel IR energy level has a semi-positive slope that exceeds the noise estimation level.

18. The system of claim 13, further comprising:

means for detecting, with a peak search metric, distinguishable peaks within a peak search window, wherein the peak search window is identified based at least in part on the identified leading edge window; and means for determining a time of arrival of a signal path based at least in part on the detected peaks.

19. The system of claim 18, wherein the means for determining the time of arrival comprises:

means for applying a maximum peak search metric to at least a channel IR, the noise estimation level, and the leading edge window; and means for applying a fat-path correction metric to at least the channel IR and an output of the maximum peak search metric.

20. The system of claim 13, further comprising:

means for adjusting parameters of the noise estimation and channel energy metrics to alter sensitivity to noise.

21. The system of claim 13, further comprising:

means for automatically adjusting parameters of one or more of the noise estimation and channel energy metrics subject to one or more automatic re-run conditions .

22. The system of claim 13, further comprising:

means for transmitting, from the AP to a tag tracking management server, the UWB signal.

23. The system of claim 22, further comprising:

means for receiving, at the AP, a plurality of reference signals from a plurality of reference points, the reference signals for locating the tag using at least one of triangulation and trilateration.

24. The system of claim 23, further comprising:

means for transmitting, from the AP to the tag tracking management server, the plurality of reference signals.

25. An apparatus for location tracking, the apparatus comprising:

a processor;

memory in electronic communication with the processor; and instructions stored in the memory, the instructions being executable by the processor to:

receive, at an access point (AP), an ultra-wideband (UWB) signal from a tag;

determine, with a noise estimation metric, a noise estimation level above which the UWB signal is detectable;

determine, with a channel energy metric, a channel impulse response (IR) energy level; and identify a leading edge window of the UWB signal based at least in part on the noise estimation level and the channel IR energy level.

26. The apparatus of claim 25, wherein the instructions to determine the noise estimation level are executable by the processor to select a maximum value of: a shaped noise estimation and a precursor threshold estimation.

27. The apparatus of claim 25, wherein the channel energy metric indicates the channel IR energy level in finite length sliding windows and indicates an existence of a channel cluster within a window duration.

28. The apparatus of claim 25, wherein the channel energy metric comprises a ratio of a fourth moment and a second moment of a channel IR.

29. The apparatus of claim 25, wherein the instructions to identify the leading edge window are executable by the processor to detect a time when the channel IR energy level has a semi-positive slope that exceeds the noise estimation level.

30. The apparatus of claim 25, wherein the instructions are executable by the processor to:

detect, with a peak search metric, distinguishable peaks within a peak search window, wherein the peak search window is identified based at least in part on the identified leading edge window; and determine a time of arrival of a signal path based at least in part on the detected peaks.

31. The apparatus of claim 30, wherein the instructions to determine the time of arrival are executable by the processor to:

apply a maximum peak search metric to at least a channel IR, the noise estimation level, and the leading edge window; and apply a fat-path correction metric to at least the channel IR and an output of the maximum peak search metric.

32. The apparatus of claim 25, wherein the instructions are executable by the processor to:

adjust parameters of the noise estimation and channel energy metrics to alter sensitivity to noise.

33. The apparatus of claim 25, wherein the instructions are executable by the processor to:

transmit, from the AP to a tag tracking management server, the UWB signal.

34. The apparatus of claim 33, wherein the instructions are executable by the processor to:

receive, at the AP, a plurality of reference signals from a plurality of reference points, the reference signals for locating the tag using at least one of triangulation and trilateration.

35. The apparatus of claim 34, wherein the instructions are executable by the processor to:

transmit, from the AP to the tag tracking management server, the plurality of reference signals.

36. A computer-program product for location tracking, the computer-program product comprising a non-transitory computer-readable medium storing instructions executable by a processor to:

receive an ultra-wideband (UWB) signal from a tag;

determine, with a noise estimation metric, a noise estimation level above which the UWB signal is detectable;

determine, with a channel energy metric, a channel impulse response (IR) energy level; and identify a leading edge window of the UWB signal based at least in part on the noise estimation level and the channel IR energy level.

37. The computer-program product of claim 36, wherein the instructions to determine the noise estimation level are executable by the processor to select a maximum value of: a shaped noise estimation and a precursor threshold estimation.

38. The computer-program product of claim 36, wherein the channel energy metric indicates the channel IR energy level in finite length sliding windows and indicates an existence of a channel cluster within a window duration.

39. The computer-program product of claim 36, wherein the channel energy metric comprises a ratio of a fourth moment and a second moment of a channel IR.

40. The computer-program product of claim 36, wherein the instructions to identify the leading edge window are executable by the processor to detect a time when the channel IR energy level has a semi-positive slope that exceeds the noise estimation level.

41. The computer-program product of claim 36, wherein the instructions are executable by the processor to:

detect, with a peak search metric, distinguishable peaks within a peak search window, wherein the peak search window is identified based at least in part on the identified leading edge window; and determine a time of arrival of a signal path based at least in part on the detected peaks.

42. The computer-program product of claim 41, wherein the instructions to determine the time of arrival are executable by the processor to:

apply a maximum peak search metric to at least a channel IR, the noise estimation level, and the leading edge window; and apply a fat-path correction metric to at least the channel IR and an output of the maximum peak search metric.

43. The computer-program product of claim 36, wherein the instructions are executable by the processor to:

adjust parameters of the noise estimation and channel energy metrics to alter sensitivity to noise.

44. The computer-program product of claim 36, wherein the instructions are executable by the processor to:

transmit, to a tag tracking management server, the UWB signal.

45. The computer-program product of claim 44, wherein the instructions are executable by the processor to:

receive a plurality of reference signals from a plurality of reference points, the reference signals for locating the tag using at least one of triangulation and trilateration.

46. The computer-program product of claim 45, wherein the instructions are executable by the processor to:

transmit, to the tag tracking management server, the plurality of reference signals.

* * * * *